United States Patent
Chesters

[15] 3,703,756
[45] Nov. 28, 1972

[54] METHOD OF PRODUCING WORMWHEELS

[72] Inventor: Walter T. Chesters, Huddersfield, England

[73] Assignee: David Brown Gear Industries Limited

[22] Filed: Jan. 20, 1970

[21] Appl. No.: 4,326

[30] Foreign Application Priority Data

Jan. 22, 1969 Great Britain............3,659/69

[52] U.S. Cl. ....................29/159.2, 74/446, 74/457
[51] Int. Cl. ......B21d 53/28, B23p 15/14, B21h 5/00, B29d 15/00, B21k 1/30
[58] Field of Search .......29/159.2, 159; 74/439, 458, 74/446, 448, 457; 219/121 EB

[56] References Cited

UNITED STATES PATENTS

| | | |
|---|---|---|
| 1,338,672 | 5/1920 | Calkins........................74/446 |
| 1,393,886 | 10/1921 | Doty............................74/460 |
| 1,847,848 | 3/1932 | Ragan......................29/159.2 |
| 3,186,082 | 6/1965 | Ulrich, Jr. et al.....29/159.2 X |
| 3,396,595 | 8/1968 | Niemann..............29/159.2 X |
| 3,562,888 | 2/1971 | Settle..........................29/159 |

Primary Examiner—John F. Campbell
Assistant Examiner—Victor A. DiPalma
Attorney—Norris & Bateman

[57] ABSTRACT

A wormwheel comprises a hub to which is welded or glued either a thin rim of another material in which are then formed conventional tooth gaps of a depth equal to or greater than the thickness of the rim, or individual helically disposed strips of another material which are subsequently formed into conventional teeth.

4 Claims, 3 Drawing Figures

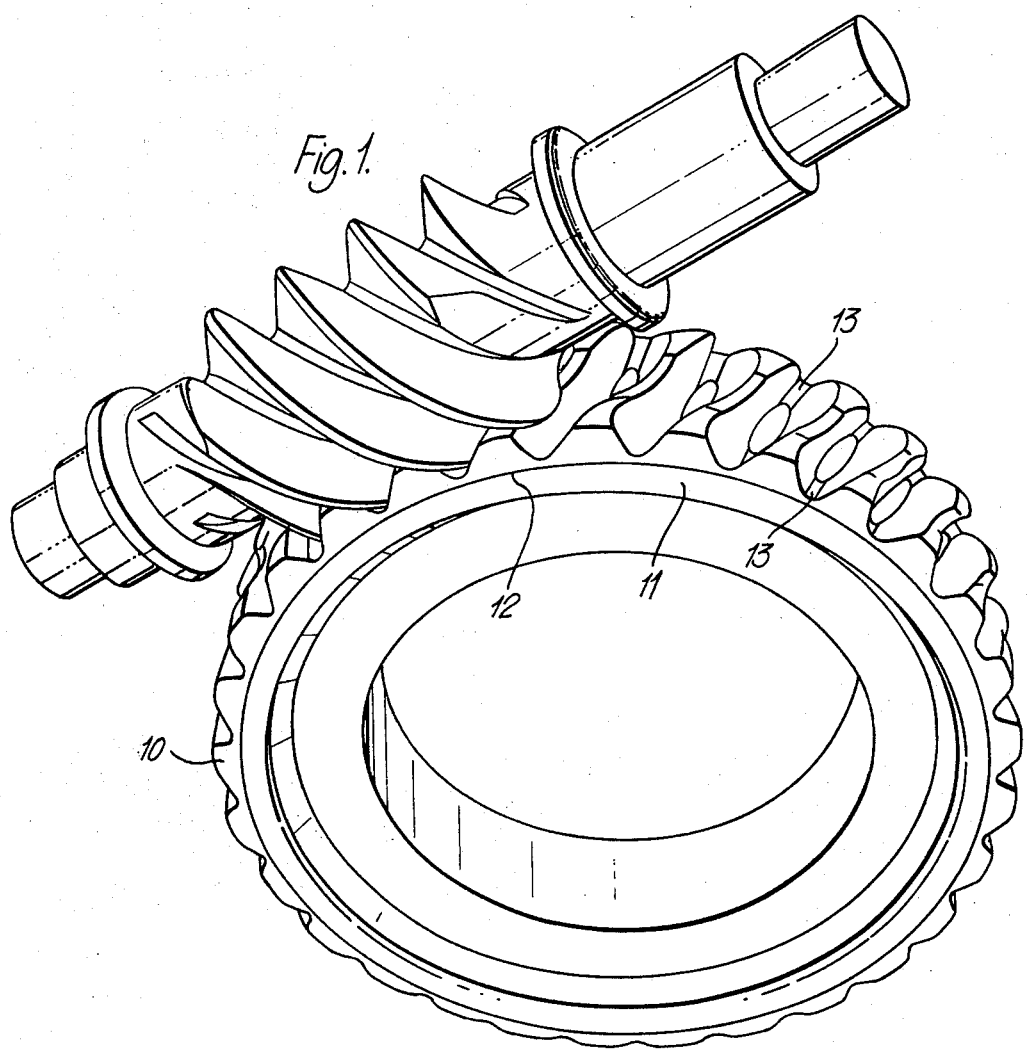
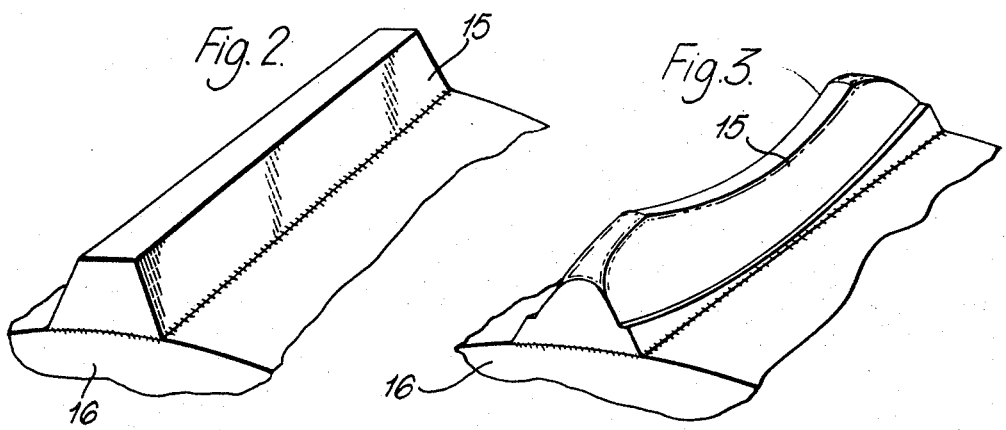
Inventor
WALTER THOMAS CHESTERS
Attorneys

METHOD OF PRODUCING WORMWHEELS

BACKGROUND OF THE INVENTION

The invention relates to wormwheels and methods of producing same.

Hitherto, the conventional method of producing wormwheels has comprised the securing of a bronze rim of large radial thickness (usually two or more times the depth of the required tooth gaps) to a ferrous hub by means of a number of keys or by welding with consumable bronze electrodes in an inert atmosphere of argon gas.

SUMMARY OF THE INVENTION

The object of the invention is to reduce the quantity of expensive material required in the production of wormwheels.

According to one aspect of the invention, a wormwheel comprises a hub formed of one material and having a plain periphery to which are secured teeth formed of another material which are unconnected to one another by said other material at least in the region of the central plane of the wormwheel.

According to another aspect of the invention, a method of producing a wormwheel comprises forming the hub, securing a rim of the other material around the hub to form a gear blank, and machining said blank to form wormwheel teeth on its periphery, said teeth alternating with tooth gaps which extend radially inwards to or beyond the periphery of the hub. Alternatively, a method of producing a wormwheel comprises forming the hub, securing around the periphery of said hub individual strips of the other material each of which strips contains within its envelope one of the required wormwheel teeth, and machining said strips to the shape of said teeth.

DESCRIPTION OF THE INVENTION

The invention will now be described, by way of example only, with reference to the accompanying drawings of which:

FIG. 1 is a perspective view of a wormwheel shown in mesh with a worm;

FIG. 2 is a wormwheel tooth before machining; and

FIG. 3 is the tooth of FIG. 2 after machining.

In one embodiment of the invention (see FIG. 1), a centrifugally cast bronze rim 10 is lightly shrunk around the plain periphery of a steel hub 11, and the resulting assembly is located on a table and rotated about an axis parallel to the beam path of an electron beam welding head, said axis being spaced from said path by a distance equal to the radius of the hub so that the beam follows the joint 12 between the hub 11 and the rim 10 to fuse them together to form a wormwheel blank. The radial thickness of the rim 10 is equal to or slightly less than the depth of the required tooth gaps, which are machined in the blank in conventional manner. The end faces of the wormwheel are machined to remove the weld bead, which is a potential stress raiser, either before or after machining the tooth gaps.

As the base of each tooth gap is concave, the finished teeth are connected integrally to one another by a very thin underlying ring 13 of bronze in the region of the end faces of the wormwheel but are unconnected to one another by any bronze in the region of the central plane of the wormwheel, thereby achieving a very considerable saving in expensive bronze compared with the conventional method of production. Electron beam welding does not require an expensive inert atmosphere and its powers of penetration ensure that the bronze is secured to the hub 11 over the entire area of contact.

In another embodiment of the invention (see FIGS. 2 and 3), individual strips 15 of extruded or continuously cast bronze of truncated triangular cross-section are located by means of a jig around the plain periphery of a steel hub 16 in spaced apart helical fashion such that each strip contains within its envelope one of the required teeth, and said strips are secured to the hub as shown in FIG. 2 by electron beam welding effected from one end face of the hub in substantially the same manner as described in the preceding paragraph. The strips 15 are then machined to the conventional tooth shape shown in FIG. 3, with a minimum of wastage in the form of swarf. The end faces of the wormwheel are machined to remove the weld beads either before or after machining the strips 15. This method of production achieves an even greater saving in bronze than the method described in the preceding paragraph.

We have found that when establishing the power ratio of a worm gear unit including a wormwheel according to the invention, it is not the strength of the weld between the hub and the teeth of the wormwheel which is the limiting factor but the resistance to wear and pitting of the tooth flanks of the gears.

In a modification, the rim or the strips is or are formed of any suitable low friction material other than bronze. In another modification, the hub is formed of any suitable inexpensive material other than steel, for instance cast iron. In a further modification, the rim or the strips is or are secured to the hub by high strength adhesive instead of by electron beam welding.

What I claim is:

1. A method of producing a wormwheel comprising providing a hub composed of one metal and having a plain periphery, securing individual strips of another metal upon said periphery with full surface-to-surface adhesion between each strip and said periphery to make a gear blank, and machining each of said strips to form on said periphery gear teeth of said other metal spaced by tooth gaps of said one metal.

2. A method of producing a wormwheel according to claim 1, wherein the securing operation is performed by electron beam welding.

3. A method according to claim 2, comprising the further step of machining the end faces of the wormwheel after the welding operation.

4. The method defined in claim 1 wherein said hub is comprised of a ferrous metal and said other metal is bronze.

* * * * *